US011720745B2

(12) United States Patent
Windmark et al.

(10) Patent No.: US 11,720,745 B2
(45) Date of Patent: Aug. 8, 2023

(54) DETECTING OCCLUSION OF DIGITAL INK

(71) Applicant: Microsoft Technology Licensing, LLC, Redmond, WA (US)

(72) Inventors: Johan Windmark, Lund (SE); Gustav Träff, Sandby (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 15/621,613

(22) Filed: Jun. 13, 2017

(65) Prior Publication Data

US 2018/0357212 A1  Dec. 13, 2018

(51) Int. Cl.
*G06F 40/171* (2020.01)
*G11B 27/02* (2006.01)
*G06F 40/169* (2020.01)
*G06F 40/216* (2020.01)

(52) U.S. Cl.
CPC .......... *G06F 40/171* (2020.01); *G06F 40/169* (2020.01); *G06F 40/216* (2020.01); *G11B 27/02* (2013.01)

(58) Field of Classification Search
CPC .......... G06F 17/24; G06F 17/25; G06T 11/60; A63F 2300/5553; A63F 2300/6623
USPC ................... 715/201, 202, 230, 255
See application file for complete search history.

(56) References Cited

U.S. PATENT DOCUMENTS

| | | | |
|---|---|---|---|
| 8,391,634 B1* | 3/2013 | Kwatra | G06K 9/2036 382/144 |
| 8,718,328 B1 | 5/2014 | Gaddy et al. | |
| 8,934,665 B2* | 1/2015 | Kim | G06K 9/00268 382/103 |
| 9,390,169 B2 | 7/2016 | Mouilleseaux et al. | |
| 9,477,649 B1* | 10/2016 | Davidson | G06F 3/04845 |
| 10,163,195 B2* | 12/2018 | Berlin | G06T 5/001 |
| 2011/0080464 A1* | 4/2011 | Alessandrini | G06T 5/005 348/42 |
| 2012/0249480 A1* | 10/2012 | Keenan | G06F 3/0428 345/175 |
| 2014/0215512 A1* | 7/2014 | Maruyama | H04N 21/2743 725/34 |

(Continued)

FOREIGN PATENT DOCUMENTS

CN    101398896 B    10/2012

OTHER PUBLICATIONS

Goldman, et al., "Video Object Annotation, Navigation, and Composition", In Proceedings of the 21st annual ACM symposium on User interface software and technology, Oct. 19, 2008, 10 pages.

(Continued)

*Primary Examiner* — Michael Roswell
*Assistant Examiner* — Jenq-Kang Chu
(74) *Attorney, Agent, or Firm* — Barta, Jones & Foley, PLLC

(57) ABSTRACT

An image processing apparatus is described comprising a processor configured to receive a video and digital ink annotated on the video. For at least a first frame of the video, the processor is configured to compute a model describing pixels of a bounding region of the ink. For a frame of the video, the processor is configured to compute a second region corresponding to the bounding region. The processor is configured to compute a comparison between the second region and the model and update the ink using the comparison.

20 Claims, 7 Drawing Sheets

(56) References Cited

U.S. PATENT DOCUMENTS

| | | | |
|---|---|---|---|
| 2014/0241582 A1* | 8/2014 | Gaddy | G06K 9/00624 |
| | | | 382/103 |
| 2014/0347475 A1* | 11/2014 | Divakaran | G06K 9/00771 |
| | | | 348/135 |
| 2015/0262428 A1* | 9/2015 | Tatzgern | G06F 3/017 |
| | | | 345/633 |
| 2015/0310135 A1* | 10/2015 | Forsyth | G06F 17/5004 |
| | | | 703/1 |
| 2016/0338120 A1* | 11/2016 | Boyle | H04L 65/1069 |
| 2018/0027206 A1* | 1/2018 | Li | G06F 3/04842 |
| | | | 348/333.02 |

OTHER PUBLICATIONS

Maass, et al., "Dynamic Annotation of Interactive Environments using Object-Integrated Billboards", In Proceedings of 14th international Conference in Central Europe on Computer Graphics, Visualization and Computer Vision, Jan. 30, 2006, 8 pages.

Stauffer, et al., "Learning Patterns of Activity Using Real-Time Tracking", In Journal of IEEE Transactions on Pattern Analysis and Machine Intelligence, vol. 22, No. 8, Aug. 2000, pp. 747-757.

Cabral, et al., "Real-Time Annotation of Video Objects on Tablet Computers", In Proceedings of the 11th International Conference on Mobile and Ubiquitous Multimedia, Dec. 4, 2012, 2 pages.

Vogel, et al., "Occlusion-aware interfaces", In Proceedings of the SIGCHI Conference on Human Factors in Computing Systems, Apr. 10, 2010, 1 pages.

Cabral, et al., "Pen-based Video Annotations: a proposal and a prototype for Tablet PCs", In Proceedings of Human-Computer Interaction, Aug. 24, 2009, 4 pages.

Li, et al., "Robust Object Tracking in Crowd Dynamic Scenes using Explicit Stereo Depth", In Proceedings of 11th Asian Conference on Computer Vision, Nov. 5, 2012, pp. 1-14.

* cited by examiner

DETECTING OCCLUSION OF DIGITAL INK

BACKGROUND

With current technology it is possible to ink, electronically (e.g. with a pen), on video. When the ink is intended to be applied to an object in the video, other objects in the video may move in front of (i.e. occlude) the inked object in some frames.

However, in current known methods of rendering the ink, the occluding objects are not taken into account and the ink is still rendered above the occluding objects. Thus, the ink is not rendered as a natural part of the scene.

In other known methods, a three-dimensional (3D) model of the whole scene is constructed from the frames of the video, in order to calculate the depth of the ink compared to other objects in the scene, in order to render the ink at the correct depth. Such a 3D model is computationally complex to perform, and is therefore not a desirable method in devices having a lower computational power (for example, mobile devices).

The embodiments described below are not limited to implementations which solve any or all of the disadvantages of known image processing systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An image processing apparatus is described, comprising a processor configured to: receive a video; receive digital ink annotated on the video; for at least a first frame of the video, compute a model describing pixels of a bounding region of the ink; for a frame of the video, compute a second region corresponding to the bounding region; compute a comparison between the second region and the model; and update the ink using the comparison.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in an image processing system, the system described is provided as an example and not a limitation. As those skilled in the art will appreciate, the present examples are suitable for application in a variety of different types of image processing systems.

Figure 1:
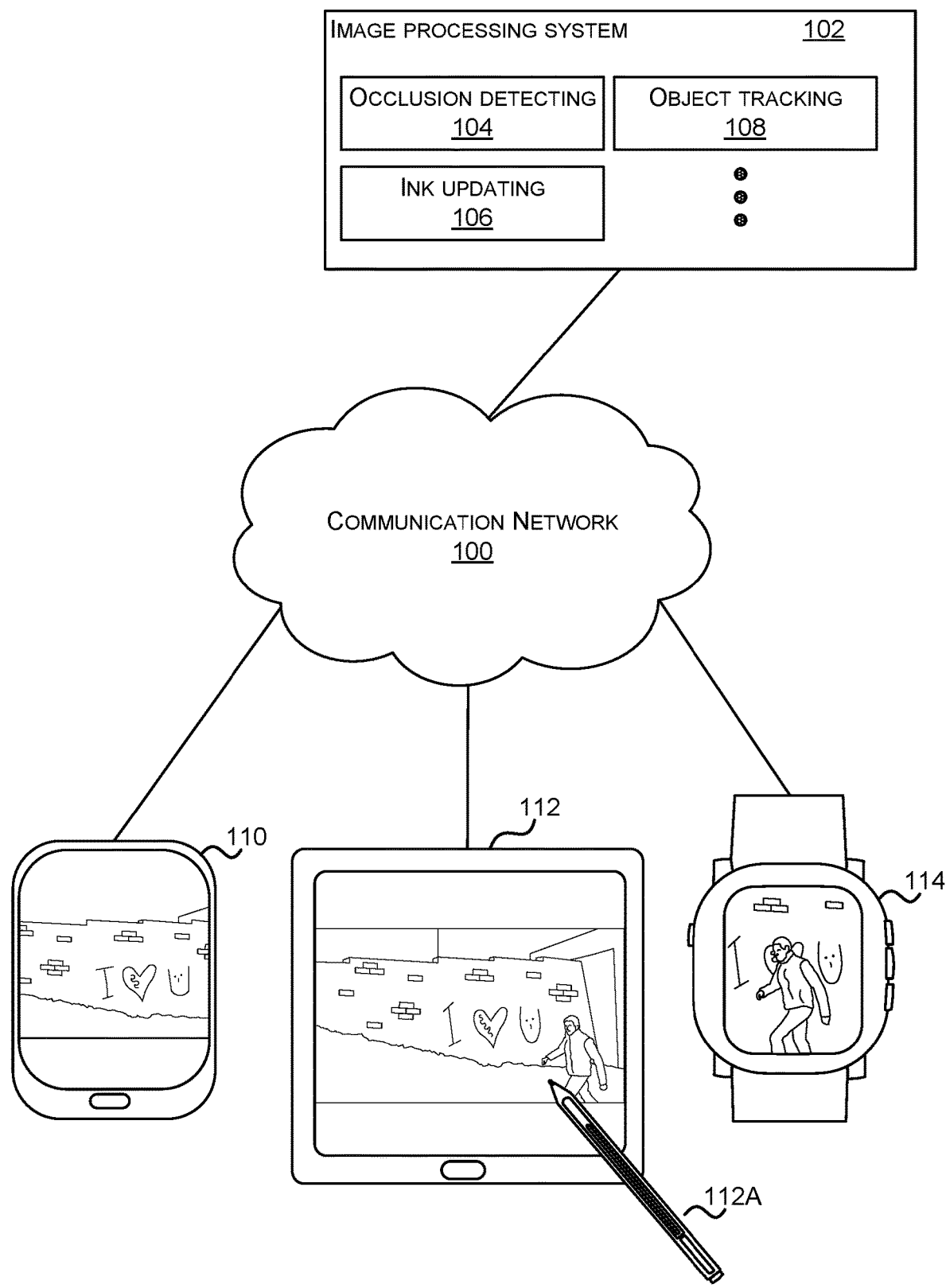
FIG. 1 is a schematic diagram of an image processing system having an occlusion detecting component and an ink updating component.

FIG. 1 is a schematic diagram of an image processing system 102 deployed at a computing device connected to a communications network 100. The image processing system 102 has an occlusion detecting component 104 which is able to estimate occlusion of digital ink in frames of a video, and an ink updating component 106 which is able to update digital ink based on occlusion information computed by the occlusion detecting component 104. The image processing system optionally has an object tracking component 108. In some examples the image processing system 102 is provided as a cloud service accessible to electronic devices such as smart phone 110, tablet computer 112, smart watch 114 or other electronic devices via communications network 100. In some cases the image processing system 102 is deployed at an electronic device such as smart phone 110 or another type of electronic device. The image processing system 102 is distributed between an electronic device 110, 112, 114 and a computing entity connected to communications network 100 in some examples.

In the example illustrated in FIG. 1 the smart phone has a video camera (not visible in FIG. 1) which has captured a video of a scene comprising a wall in the background. A user has annotated a frame of the video by drawing electronic ink (digital ink) on the wall. The video has been captured by a user holding the smart phone 110. In the video, a man walks in front of the wall. The image processing system 102 is used to detect when the man walks in front of a part of the wall which has the electronic ink applied to it, and thus which parts of the ink to hide (i.e. parts of the ink which is occluded by the man). For example, FIG. 1 shows a tablet computer 112 playing the video and with a different frame of the video visible than for the smart phone 110 of FIG. 1. The man does not occlude the ink and thus no parts of the ink are hidden by the image processing system 102. FIG. 1 also shows a smart watch 114 displaying another frame of the video in which the man is in front of a part of the wall on which the ink has been applied. In this case, the image processing system 102 detects that the man is occluding a part of the wall which has ink on it, and hides occluded parts of the ink. Thus, the ink has the appearance of having the same depth as the wall in the video. The image processing system 102 estimates occlusion by computing a model describing the region of the wall on which the ink is applied, and compares pixels in a corresponding region in subsequent frames to the model. The comparison allows the image processing system 102 to compute an estimate of whether occlusion has occurred. This is because, if there is a difference between the second region and the model it suggests that a foreground object has entered the scene depicted in the second region.

The image processing system 102 is computer implemented using any one or more of: software, hardware, firmware. Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
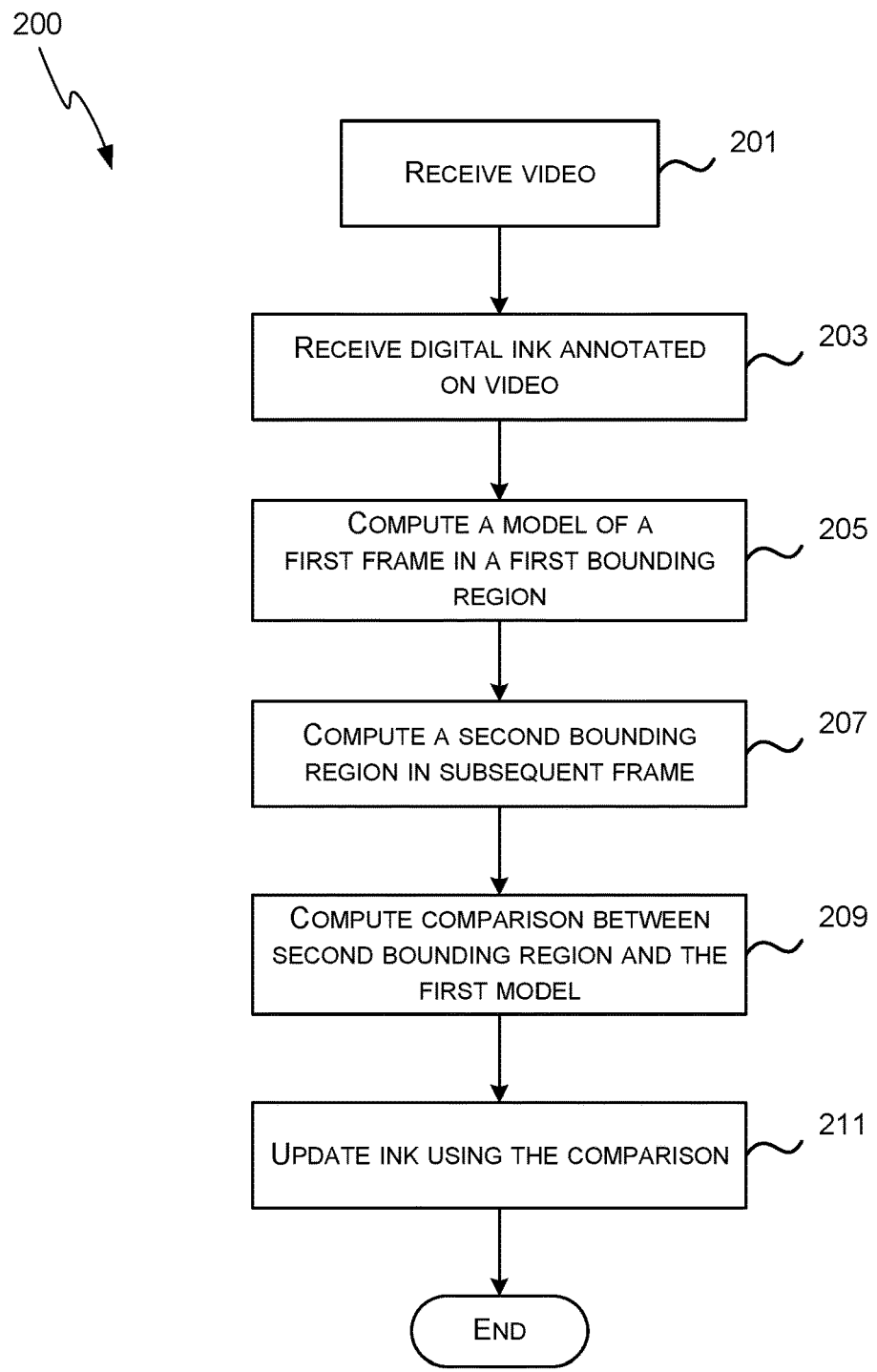
FIG. 2 is a flow diagram of a method for detecting occlusion of digital ink in a digitally annotated video.

FIG. 2 is a flow diagram of a method for detecting occlusion of digital ink in a digitally annotated video. First, a video is received 201 by e.g. an image processing system 102, and digital ink (e.g. a group of digital ink strokes) annotated on the video is also received 203. The digital ink may have been previously applied to the video or a frame of the video by a user, for example.

A model is then computed 205, describing pixels of at least a first frame which are in a first bounding region containing the ink. In some examples the model comprises a single statistical model describing all of the pixels of at least the first frame in the bounding region. In other examples, the bounding region is divided up into a set of grid cells or sub-regions which make up the bounding region, and the model comprises a set of sub-models, each describing a respective grid cell of the bounding region. The grid cells may extend over m×n pixels (e.g 1×3, 3×3, 32×32 etc.). In particular, in some examples, each grid cell or sub-region may cover one pixel (i.e. a 1×1 grid cell). The bounding region is, for example, a rectangle containing the ink, but any polygon with at least three vertices or any other closed shape containing the ink defines the bounding region in other examples. Various models/sub-models may be used to describe the pixels of the first bounding region, and some are described in more detail herein. A second region is then computed 207, corresponding to the bounding region, in a subsequent frame. This may be performed before or after (or at the same time as) computing the model of the first bounding region. Where the second region is computed at the same time as or before computing the model, in some examples information from the pixels of the second region is used to generate the model. A second region may be computed, for instance, where the digital ink has been applied to a background and the camera is moving, it is necessary to track the movement of the background so that the ink is correctly "locked" to the background. Any object tracking algorithm may be used to track the background. For instance, in one example a template (i.e. a plurality of pixels) of a part of the bounding region is generated, and the subsequent frame is searched to find a matching region (i.e. of corresponding pixels) which most closely matches the template. This is done, for example, using a normalized cross correlation function or other comparison metric and results in a transformation consisting of a translation and a scale. Alternatively, in another example a set of keypoints (such as oriented fast and rotated brief (ORB) keypoints, or other local image features) are detected in the bounding region, and corresponding keypoints are found in the subsequent frame to compute a homography transformation. This is done, for example, using keypoint descriptor matching followed by random sample consensus (RANSAC) optimization or any other optimization algorithm. The ink and the model are mapped to the subsequent frame using the transformation based on the relationship between the template and the matching region (i.e. so that the ink is "locked" to the background).

Next, a comparison is computed 209 between the second region and the model (i.e. between the pixels and the model or the relevant sub-model for that pixel), to decide which regions of the second region are occluded regions (i.e. which parts of the ink are to be hidden). In some examples, the comparison comprises a similarity value between pixels of the second region and the model. An example of the comparison is described in more detail below. The model may optionally be updated with those parts of the second region which are not occluded regions. This gives the benefit that the model is updated over time as the process repeats, and takes into account gradual changes in the video such as illumination changes.

Finally, the ink is updated 211 using the results of the comparison, so that regions of ink which are occluded by a foreground object are hidden, in order to give the ink the same "depth" as the background object on which it was applied. The ink is overlayed on top of the video as originally recorded, and so without the above method being applied, the ink appears on top of both the foreground and background objects. Thus, when the ink is updated using the results of the comparison, the ink is hidden in areas where foreground objects are detected, in order to give the ink depth compared to the foreground objects in the video. In some examples, the results of the comparison are improved using segmentation techniques such as graph cut based methods or other segmentation methods and refined by local filtering. Any local filtering can be used and in an example, cross bilateral filtering is used whereby the mask (regions of hidden ink) is filtered using the color video frame as a guide.

In some examples, the method outlined above is extended to apply separately to any number of ink strokes in the video.

Various models/sub-models are used to describe the pixels of a frame which are in a bounding region containing the ink. For instance, in some examples the technology uses a statistical sub-model for each pixel in the bounding region which is updated for each consecutive frame in the video. The set of sub-models, combined, make up a model describing the bounding region. For such a statistical sub-model the region having the digital ink should not be covered by any foreground objects in at least one frame of the video. If it is not the first frame (i.e. when the ink was applied), the method for detecting occlusion would still be effective, so long as additional information is provided to determine which frames do not have the occlusion. In many cases the majority of the frames do not have occlusion and in some examples it is automatically determined which frames to use when creating the statistical sub-models.

In some examples, a plurality of statistical sub-models are computed, each for an individual pixel of the bounding region. An example of such a statistical sub-model is defined as a normal distribution with the probability density function (PDF):

$$f(x \mid \mu, \sigma^2) = \frac{1}{\sqrt{2\pi\sigma^2}} e^{-\frac{(x-\mu)^2}{2\sigma^2}}$$

Where μ is the mean or expectation of the distribution (and also its median and mode), σ is the standard deviation and σ² is the variance, and x is the intensity of the pixel being considered. In some examples, the intensity is the greyscale intensity whilst in others it is the color intensity of one color channel of the pixel. In yet further examples, the intensity is generalized to any number of channels by multiplying each PDF for whichever channels to get the total PDF. The PDF tells how likely it is that a pixel value belongs to the previous observed pixel values for given pixel. In one example the channels correspond to the color channels of the video frame. In other examples the channels are features, i.e. gradients, gradient magnitudes, gradient angles, edge responses; computed based on a pixel neighborhood.

The sub-model is initialized by setting the mean as an observed pixel value (such as from an early frame of the video). The variance is initially set to a default value which is determined empirically or selected according to the types of image data to be processed. In some examples, to have a more robust estimation of the model variance, the variance is initialized as the average of the squared difference of the pixels in the region with approximately the same gradient magnitude as the given pixel to define the model for.

To compute the comparison between the second region and the model using the set of sub-models described above, the likelihood that a pixel of the subsequent frame is a foreground pixel, and thus that digital ink on the pixel should be hidden due to occlusion (or in other words, the similarity value), is defined as:

$$p(x|t)=1-f(x|\mu,\sigma^2)$$

Which is expressed in words as, the probability that a given pixel location with intensity x in time frame t is a member of the foreground is equal to one minus a probability density function describing previously observed intensity values of pixels at the same location in other frames of the video.

The comparison thus generates an occlusion probability map comprising values p(x|t) for each pixel, calculated from the similarity values of the individual pixels of the second region. In some examples, the probability map is applied to the ink to update it, so that ink is partially hidden at a magnitude proportional to the probability value. In other examples, a system is configured to hide any ink on pixels whose probability of being a foreground pixel is above a predetermined threshold value (for example about 0.7, corresponding to 1.5 standard deviations, however, note that other values can be used depending on the types of images and the particular capture devices and processors being used). A pixel is considered to be in the background if the likelihood is below the predetermined value. The predetermined threshold differentiates the pixels between foreground and background pixels, and thus generates an occlusion map indicating pixels of the second region which have a similarity value below a predetermined threshold value. Optionally, to reduce exposure changes of video frames such as changed exposure time and white balance, adjustments of model parameters are made based on histogram matching between the first and the second video frame.

Optionally, to reduce noise in the detection of foreground objects (i.e. occluding objects) a spatial filtering is applied on neighboring pixels (for instance 5×5 neighboring pixels or other numbers of neighboring pixels). In some examples, the spatial filtering of the probability map is a cross bilateral filtering summarized as:

$$p_{filtered}(x|t) = \frac{1}{W_p}\sum_{x_i\in\Omega} p(x_i|t)f(\|I(x_i|t)-I(x|t)\|)g(\|x_i-x|t\|)$$

Where the summation is over a window centered in x (i.e. a 5×5 window), $W_p$ is a normalization term, f is a range kernel (i.e. a Gaussian function) acting on the video frame I, g is a spatial kernel (i.e. a Gaussian function). The above mathematical expression is expressed in words as, the probability of a pixel at a given location in a frame at time t of the video, after cross bilateral filtering has been applied is equal to a weighted average of the probabilities in a neighborhood where the weights also depend on the color pixel differences in the video frame. In some examples, $p_{filtered}$ is a non-weighted average of the probabilities in a neighborhood Again, a pixel is considered to be in the foreground if the filtered likelihood is above a predetermined value. For instance, in some models the value may be 0.7 (within 1.5 standard deviations) but other values can be used depending on the particular types of capture devices, the processors used and other factors. A pixel is considered to be in the background if the filtered likelihood is below the predetermined value. In other words, foreground pixels are hidden based on the probability map. In some examples, neighboring foreground pixels are subsequently grouped using connected component labeling to further filter the map and avoid false detections of small areas of foreground pixels. Optionally, the ink is hidden if a group of foreground pixels is larger than about 5% of the bounding region.

The above-described model may be expanded so that, instead of creating a statistical sub-model for each pixel, the region is divided into a grid with m×n pixels in each cell, and a model similar to the above is generated for each cell (i.e. by using the same statistical method—but with the additional step of averaging over the m×n pixels in each frame—to find the mean and variance). In other words, the model comprises a plurality of sub-models describing pixels in a plurality of sub-regions (each grid cell) making up the bounding region. In the subsequent frames, each pixel is compared to the sub-model of whichever cell it belongs to. This is done to improve performance and robustness against distortions near sharp edges in the video. In the examples where each sub-model describes a grid of pixels (as opposed to a single pixel, or a 1×1 grid of pixels), the mean and variance need not be initialized as a default value as there are sufficient pixels in each grid cell to compute a mean and variance.

For any sub-model describing any sized grid cell (e.g. a single pixel or an number of pixels), the set of sub-models may optionally be further updated using pixels from subsequent frames which have not been found to be foreground pixels (as the foreground pixels are not representative of the background). More specifically, each sub-model may be further updated using pixels in the relevant grid cell from subsequent frames, which have been found to be background pixels.

For each consecutive frame, and for pixels that have been identified as background pixels, the relevant sub-model is updated according to the learning algorithm (i.e. an algorithm that evolves the model to adapt to the subsequent frame):

$$\mu(t) = (1-\alpha)*\mu(t-1) + \alpha*\frac{1}{n}\sum_{i=1}^{n}x_i(t)$$

-continued and $$\sigma^2(t) = (1-\alpha)*\sigma^2(t-1) + \alpha*\frac{1}{n}\sum_{i=1}^{n}(x_i(t) - \mu(t))^2$$

Where t is the time and a is the learning rate, depending on how rapidly the sub-model should update. The above learning algorithm updates the mean of the probability density function of the sub-model (for a specified pixel location), at the video frame for time t by setting it equal to one minus the learning rate, times the mean of the probability density function of the sub-model at the video frame for time t minus 1, plus the learning rate, times the average value of the intensity of the corresponding pixels in the frame at time t, that have been identified as background pixels in the video frame for time t. (In the case of a single pixel or 1×1 grid cell, the second half of the equation would be equal to one minus the learning rate, times the mean of the probability density function of the sub-model at the video frame for time t minus 1, plus the learning rate, times the value of the intensity of the corresponding pixel in the frame at time t, that has been identified as a background pixel). The above learning algorithm updates the variance of the probability density function of the model at the video frame for time t (for a specified pixel location or grid cell) to be equal to one minus the learning rate times the variance of the probability distribution for the specified pixel location or grid cell at video frame t−1, plus the learning rate times the average squared difference between the intensity of the pixel or grid cell and the mean intensity, of the pixels in the new frame that have been identified as background pixels.

In the case where the video has been captured with a freely moving camera, the above model (comprised of the sub-models) may still be used. As outlined above, a homography between each frame for the bounding region is found, and the bounding region is moved (along with the statistical models) to compensate for the camera motion. If large camera motion is detected then in some examples a higher learning rate, a, is used to compensate for additional distortions in the statistical model due to the motion.

In some examples, an alternative method of modeling the pixels of the frames is used. In one example, data is collected from substantially the whole video sequence. A statistical model is constructed using substantially all of this data. In the next step occlusion is detected by looking back at each frame and making a decision about which pixels of which frame are occluded. This may be performed using similar methods to those described herein (for example generating a probability distribution as described herein, and marking pixels in each frame as occluded or not occluded using the probability distribution of the data). This method negates the need to update the model between each frame.

In other examples, the pixels are modelled using a Gaussian mixture model of at least one color channel of grids of pixels in the bounding region. In the model, for each grid cell a sub-model using one normal distribution is estimated. The model is estimated by using a best-fit algorithm. If the fit is worse than a threshold value, then a second normal distribution is added to the model and the distribution is updated with the best fit. This may be beneficial for scenes with small flickering details. The Gaussian mixture model is particularly useful for examples where larger (e.g. 3×3 and above) grid cells are used, or for videos having a number of frames that are known to have no occlusion in them, in order to be able to model a sufficient number of pixels for each sub-model. In this model, it is determined if a pixel is in the foreground or the background by testing pixels in the subsequent frame. Each pixel is tested for the probability that it belongs to each of the normal distributions of the Gaussian mixture model. If the probability is below a threshold for each of the normal distributions (for example, indicating 1.5 standard deviations, although other values can be used depending on the types of images and the particular capture devices and processors being used), then it is decided that the pixel does not belong to any background class and is thus a foreground pixel. The accuracy of the Gaussian mixture model may be improved by also weighting the different distributions of the model based on the frequency that the background pixels belong to each distribution (estimated by the number of samples).

Figure 3A:
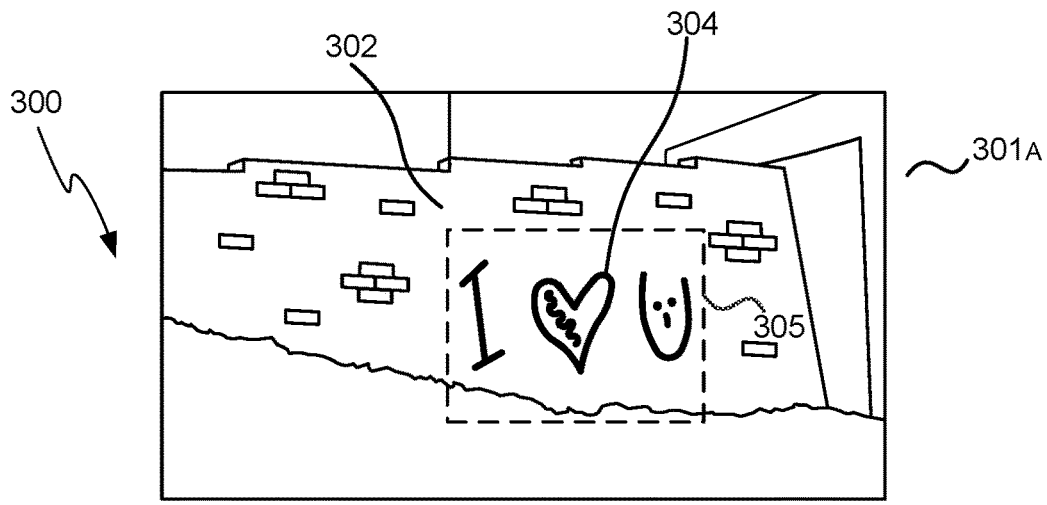
FIGS. 3A to 3C are schematic diagrams showing how digital ink is rendered in frames of a video by the image processing system of FIG. 1.
Figure 3B:
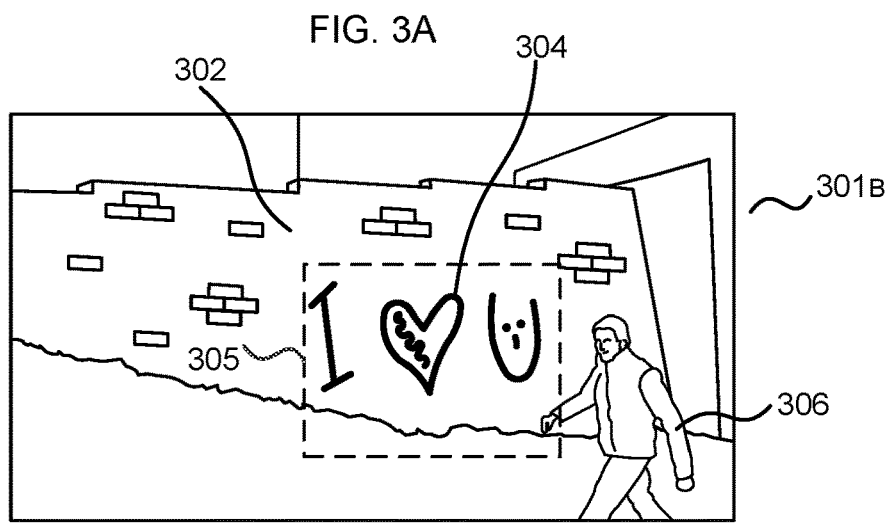
Figure 3C:
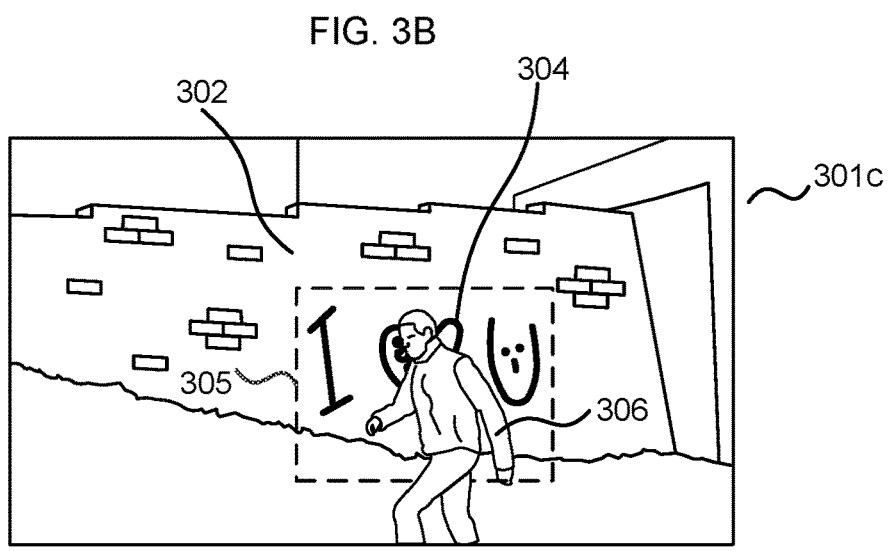

FIGS. 3A to 3C are schematic diagrams showing how digital ink is rendered in frames of a video 300 by the image processing system of FIG. 1 using the method as described in FIG. 2. FIG. 3A shows a first frame 301A, wherein digital ink 304 has been applied to a wall 302 in the background. The image processing system 102 computes a bounding region 305 containing the digital ink 304. In a subsequent frame 301b, a man 306 walks into view and into the bounding region 305, but does not occlude any part of the wall 302 which has ink 304 applied to it. The image processing system 102 does not hide any of the ink. In a third frame 301c, the man 306 walks in front of a part of the wall 302 which has ink 304 applied to it. The image processing system 102 detects the pixels of the wall 302 which have ink 304 on it and which have been occluded by the man 306. As a result the ink 304 is updated to hide the parts of the ink 304 that are on occluded parts of the wall 302.

Figure 4A:
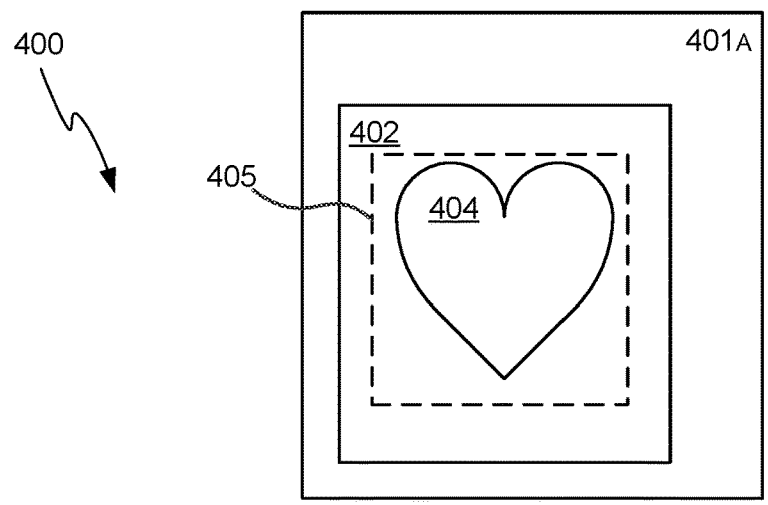
FIGS. 4A to 4C are schematic diagrams showing how digital ink is rendered in frames of a second video by the image processing system of FIG. 1.
Figure 4B:
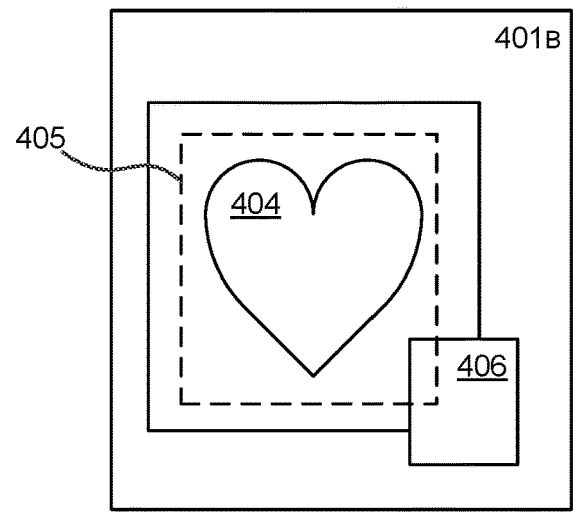
Figure 4C:
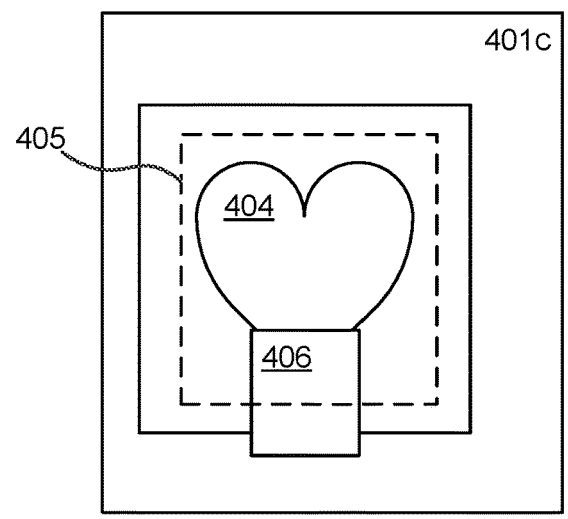

FIGS. 4A to 4C are schematic diagrams showing how digital ink is rendered in frames of a second video 400 by the image processing system of FIG. 1, wherein cells of multiple pixels are modelled for each sub-model instead of a single pixel. Similar to the video 300 shown in FIGS. 3A to 3C, FIG. 4A shows a first frame 401A, wherein digital ink 404 has been applied to a background 402. The image processing system 102 computes a bounding region 405 containing the digital ink 404. In a subsequent frame 401b, an object 406 moves into view, and into the bounding region 405, but does not occlude any part of the background 402 which has ink 404 applied to it. The image processing system 102 does not hide any of the ink. In a third frame 401c, the object 406 moves in front of a part of the background 402 which has ink 404 applied to it. The image processing system 102 detects the pixels of the background 402 which have ink 404 on it and which have been occluded by the object 406. As a result the ink 404 is updated to hide the parts of the ink 404 that are on occluded parts of the background 402.

Figure 5:
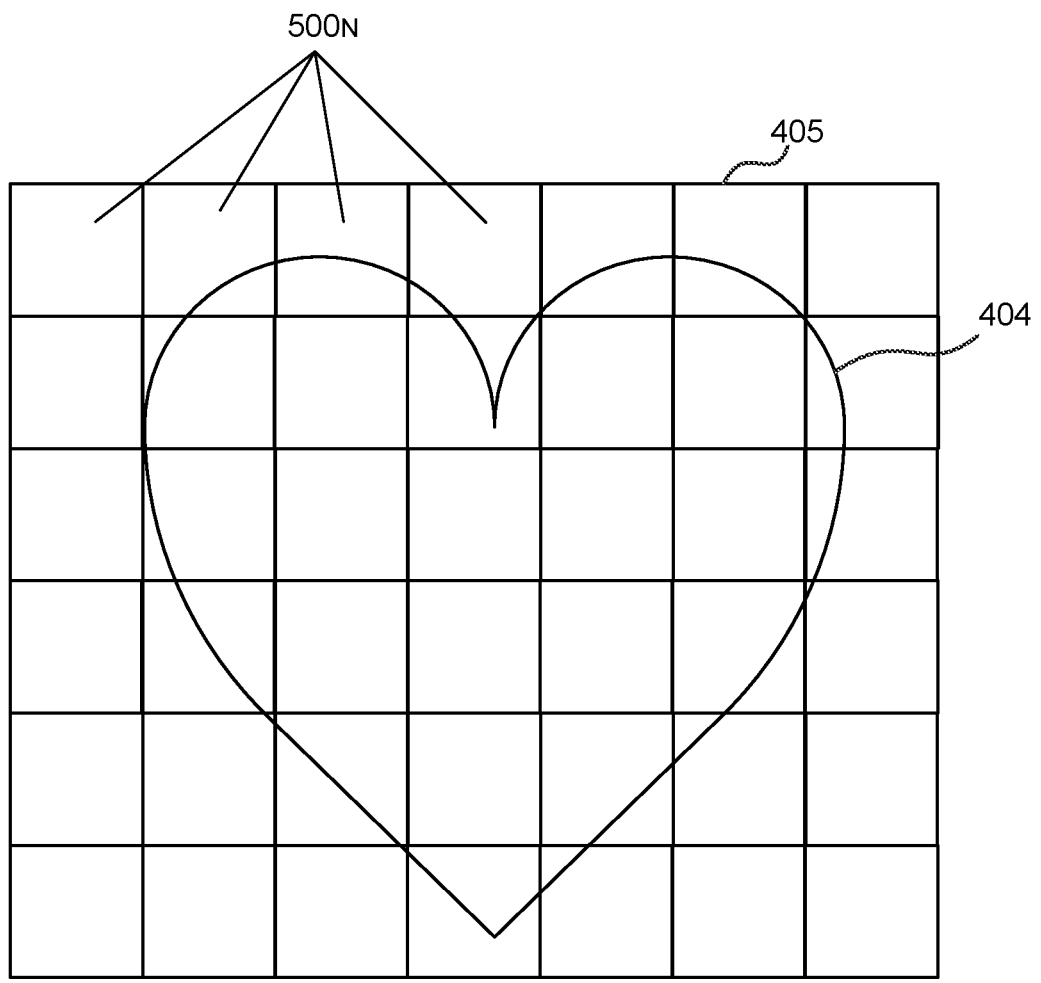
FIG. 5 is a schematic diagram showing a set of sub-regions making up a bounding region of digital ink.

FIG. 5 shows how a bounding region 405 of the ink 404 is divided up into sub-regions 500n, each a grid cell containing a plurality of pixels. A sub-model is computed for each sub-region as outlined above. The values of the sub-models may be interpolated at the boundaries of the sub-regions 500n to mitigate against discontinuities or abrupt changes.

Figure 6:
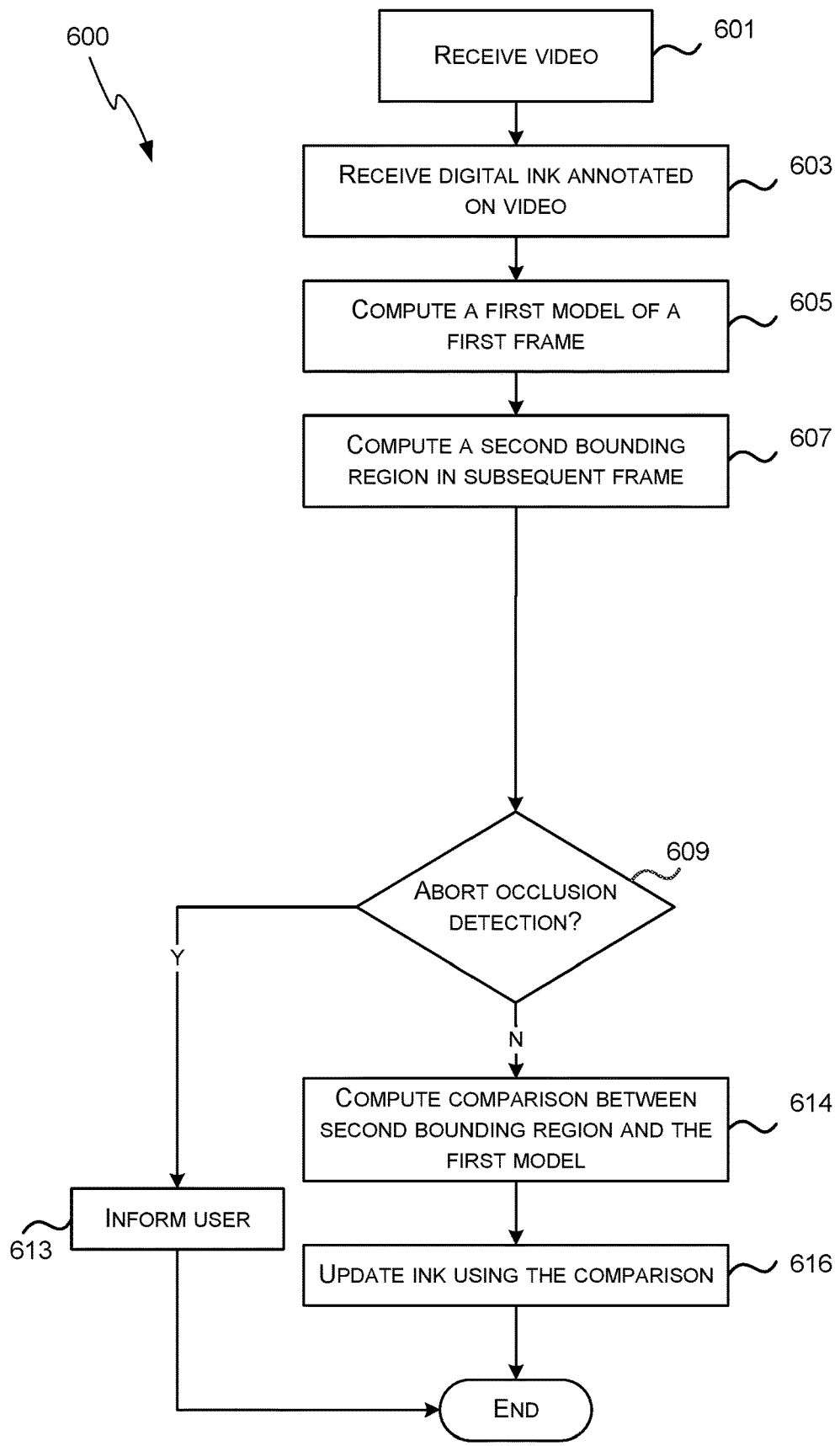
FIG. 6 is a flow diagram of an alternate method for detecting occlusion of digital ink in a digitally annotated video.

FIG. 6 is a flow diagram of an alternate method for detecting occlusion of digital ink in a digitally annotated video. As in the case of the method shown in FIG. 2, first, a video is received 601 by e.g. an image processing system 102, and digital ink (e.g. a group of digital ink strokes) annotated on the video is also received 603. The digital ink may have been previously applied to the video or a frame of the video by a user, for example.

A model is computed 605, describing pixels of at least a first frame which are in a bounding region containing the ink. In some examples the model comprises a single statistical model describing substantially all of the pixels of at least the first frame in the bounding region. In other examples, the bounding region is divided up into a set of grid cells which make up the bounding region, and the model comprises a set of sub-models, each describing a respective grid cell of the bounding region. The grid cells may extend over m×n pixels (e.g 1×3, 3×3, 32×32 etc.). In particular, in some examples, each grid cell may cover one pixel (i.e. a 1×1 grid cell). The bounding region is, for example, a rectangle containing the ink, but in other examples any polygon with at least three vertices or other closed shape containing the ink defines the bounding region. Various models/sub-models may be used to describe the pixels of the first frame, and some are described herein with respect to FIG. 2 and are also applicable to the method of FIG. 6. A second region is then computed 607, corresponding to the bounding region, in a subsequent frame. This may be performed before or after (or at the same time as) computing the model (e.g. comprising a set of sub-models) of the first bounding region. Where the second region is computed at the same time as or before computing the model, in some examples the model also uses information from the pixels of the second region to generate the model. A second region may be computed, for instance, where the digital ink has been applied to a background and the camera is moving, it is necessary to track the movement of the background so that the ink is correctly "locked" to the background. Any object tracking algorithm may be used to track the background, as described previously with respect to FIG. 2.

Next, it is decided 609 whether the occlusion detection mechanism should be aborted. Certain criteria regarding the video data may be checked to determine whether it should be aborted or not. The criteria may be indicative of the occlusion mechanism being effective (in other words, if the criteria is not fulfilled then it may be indicative of the method not being successfully completed, or having poorer results). In some examples, this may be when the algorithm used for generating the second bounding region fails. In other examples, it may be that the matching algorithm used to track the movement of the background gives a matching score below a selected threshold value. In other examples, it may be that global properties of the subsequent frame differs (e.g. if a mean value of the whole frame changes more than a threshold value), which is indicative of a situation where the occlusion detection mechanism will not be accurate. In further examples, it may be that the variance of the model is greater than a threshold value, or the variances of a threshold number (for example 50%) of grid cells are greater than a threshold value, which is indicative of an inaccurate model of the background. In some examples, it is decided that whether the occlusion detection mechanism should be aborted after generating 614 a comparison between the second bounding region and the model. In those examples, it may be that the proportion of pixels determined as foreground pixels exceeds a threshold percentage (for example 90%), which may make the occlusion detection mechanism inaccurate. Some examples use a combination of the above factors in determining whether the method should be aborted.

If it is determined that the method should be aborted, then the user is informed 613 and the method terminates without the ink being updated.

If it is determined that the method should not be aborted, a comparison is computed 614 between the second region and the model (if the comparison has not already been generated), to decide which regions of the second region are occluded regions (i.e. which parts of the ink are to be hidden). The model may optionally be updated to include those parts of the second region which are not occluded regions.

Finally, the ink is updated 616 using the comparison, so that regions of ink which are occluded by a foreground object are hidden, in order to give the ink the same "depth" as the background object on which it was applied.

Figure 7:
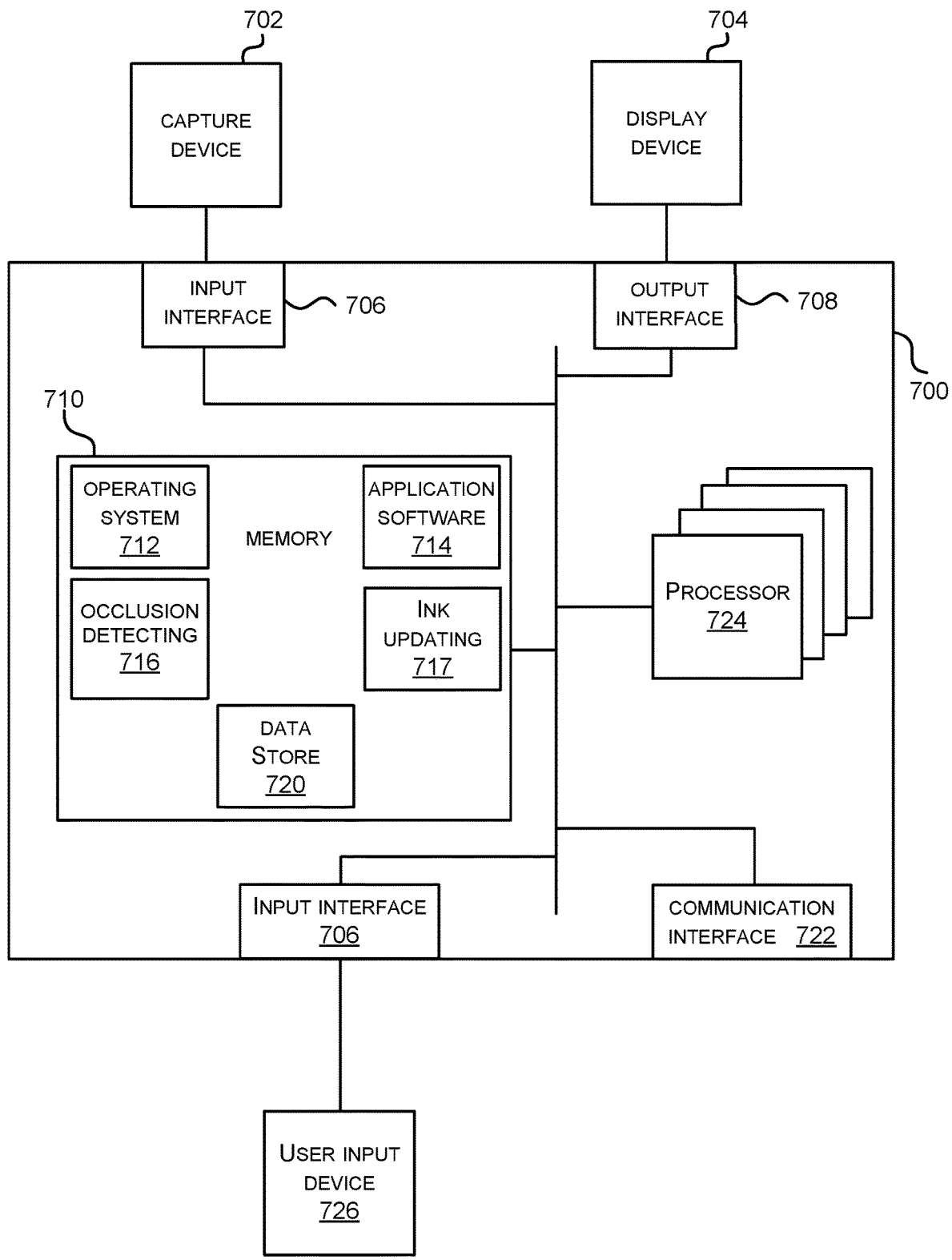
FIG. 7 illustrates an exemplary computing-based device in which embodiments of an image processing system are implemented.

FIG. 7 illustrates various components of an exemplary computing-based device 700 which are implemented as any form of a computing and/or electronic device, and in which embodiments of image processing apparatus with an occlusion detecting and ink updating facility are implemented in some examples.

Computing-based device 700 comprises one or more processors 724 which are microprocessors, controllers or any other suitable type of processors for processing computer executable instructions to control the operation of the device in order to carry out image processing with occlusion detection. In some examples, for example where a system on a chip architecture is used, the processors 724 include one or more fixed function blocks (also referred to as accelerators) which implement a part of the method of FIG. 2 or FIG. 6 in hardware (rather than software or firmware). An occlusion detecting component 716 is able to detect occlusion of digital ink in a video as described herein. An ink updating component 717 is able to update the digital ink based on information from the occlusion detecting component 716 as described herein. Platform software comprising an operating system 712 or any other suitable platform software is provided at the computing-based device to enable application software 714 to be executed on the device.

The computer executable instructions are provided using any computer-readable media that is accessible by computing based device 700. Computer-readable media includes, for example, computer storage media such as memory 710 and communications media. Computer storage media, such as memory 710, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 710) is shown within the computing-based device 700 it will be appreciated that the storage is, in some examples, distributed or located remotely and accessed via a network or other communication link (e.g. using communication interface 722).

The computing-based device 700 also comprises an input interface 706 which receives inputs from a capture device 702 such as a video camera, depth camera, color camera, web camera or other capture device 702. The input interface 706 also receives input from one or more user input devices 726. The computing-based device 700 comprises a an output interface 708 arranged to output display information to a display device 704 which may be separate from or integral to the computing-based device 700. A non-exhaustive list of examples of user input device 726 is: a stylus, a mouse, keyboard, camera, microphone or other sensor. In some examples the user input device 726 detects voice input, user gestures or other user actions and provides a natural user interface (NUI). This user input may be used to change values of parameters, view responses computed using similarity metrics, specify templates, view images, draw electronic ink on an image, specify images to be joined and for other purposes. In an embodiment the display device 704 also acts as the user input device 726 if it is a touch sensitive display device. The output interface 708 outputs data to devices other than the display device in some examples, e.g. a locally connected printing device (not shown in FIG. 7).

Any of the input interface 706, output interface 708, display device 704 and the user input device 826 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An image processing apparatus configured to detect occlusion of digital ink in a digitally annotated video, comprising a processor configured to: receive a video; receive digital ink annotated on the video; for at least a first frame of the video, compute a model describing pixels of a bounding region of the digital ink; for a frame of the video, compute a second region corresponding to the bounding region; compute a comparison between the second region and the model; and update the ink using the comparison. This enables the ink to be updated based on the comparison so that occlusion of the ink is calculated with reduced computational complexity.

The image processing apparatus described above, wherein the comparison comprises a computed similarity value between pixels of the second region and the model.

The image processing apparatus described above, wherein the processor is further configured to update the model to describe pixels of the second region which have a similarity value above a predetermined threshold value if data from the second region has not yet been included in the model. This allows the model, to evolve as the bounding region evolves (for example if lighting conditions for the object on which the digital ink is applied change in subsequent frames).

The image processing apparatus described above, wherein the model is updated according to a learning algorithm having a learning rate. The learning rate enables the model to evolve where the properties of the background may also be changing.

The image processing apparatus described above, wherein the processor is configured to change the learning rate. A higher learning rate compensates for additional distortions in the statistical model. For example, the processor may be configured to raise the learning rate for a number of frames if the computed second bounding region has a large estimated translation, since the translation may be less exact and thus the model may need to be adjusted faster. In another example, if global changes in exposure are detected in the video, it is first compensated in the model and the learning rate is raised for a number of frames to compensate for small errors in the compensation.

The image processing apparatus described above, wherein the comparison comprises an occlusion map indicating pixels of the second region which have a similarity value below a predetermined threshold value. This occlusion map is simple to compute based on the comparison.

The image processing apparatus described above, wherein the comparison comprises an occlusion probability map calculated from the similarity values of the individual pixels of the second region. The probability map enables a more accurate estimate of occlusion to be calculated.

The image processing apparatus described above, wherein the probability map is filtered using a cross bi-lateral filter to generate the comparison. The cross bi-lateral filter lowers the frequency anomalies in the occlusion probability map (for example a pixel which is marked as "not occluded" on the probability map, but which is surrounded by occluded pixels).

The image processing apparatus described above, wherein the processor is configured to update the ink by applying the probability map to the ink. The updated ink therefore has occluded regions, non-occluded regions and partially occluded regions, which may smooth out the ink at the boundary of an occluding object.

The image processing apparatus described above, wherein the processor is configured to compute the comparison by: generating an occlusion map indicating occluded pixels of the second region which have a similarity value below a predetermined threshold value; and for each pixel not indicated as occluded, marking the pixel as occluded if the number of occluded pixels in a selected neighborhood of the pixel is above a predetermined threshold value. This configuration lowers the frequency of anomalies in the occlusion probability map.

The image processing apparatus described above, wherein the processor is configured to update the ink by segmenting the comparison between the second region and the first model using a graph cut algorithm.

The image processing apparatus described above, wherein the model comprises a statistical model of at least one channel of the pixels in the bounding region, and the processor is configured to compute the comparison by comparing the intensity of the at least one channel of the pixels in the second region to the model. The statistical model provides an apparatus for efficiently and/or accurately differentiating between an object on which the digital ink is applied, and an occluding object.

The image processing apparatus described above, wherein: the model comprises a set of sub-models describing pixels of the at least first frame in a set of respective first sub-regions making up the bounding region; the second region comprises a set of second sub-regions corresponding to the set of first sub-regions; and the processor is configured to compute a comparison between each pixel of each second sub-region and the corresponding sub-model.

The image processing apparatus described above, wherein the processor is configured to interpolate the comparison at the boundaries between neighboring sub-regions. This feature enables the apparatus to smooth differences in the comparisons at the boundaries the ink is further inhibited from following the lines of the boundaries.

The image processing apparatus described above, wherein each sub-model describes pixels of a cell of a grid. This reduces the effect of any boundary problems of the sub-models.

The image processing apparatus described above, wherein the processor is further configured to prior to updating the ink or prior to generating the comparison: check a set of criteria for the video, the criteria being indicative of the occlusion mechanism being effective; and if the criteria is not fulfilled, then abort any remaining steps for detecting occlusion. This enables the apparatus to disable the occlusion estimation mechanism in cases where the method may not be successful or yield accurate results. For example, the criteria not being fulfilled may indicate that an object on which the digital ink is applied is dynamically changing rapidly enough between frames such that the accuracy of the comparison may be decreased.

The image processing apparatus described above, wherein the processor is configured to compute a second region corresponding to the bounding region by: selecting a plurality of template pixels of the bounding region; matching the template pixels of the bounding region to corresponding matching template pixels in the subsequent frame: generating a homography transform matrix using the matching; and applying the homography transform matrix to the bounding region to generate the second region. This allows the apparatus to efficiently track an object which the ink is placed on in order to allow the ink to move with the object in the subsequent frame.

The image processing apparatus described above, wherein the processor is configured to match the template pixels by searching the subsequent frame for a similar plurality of pixels, using template matching.

A computer-implemented method for detecting occlusion of digital ink in a digitally annotated video, comprising the steps of: receiving a video; receiving digital ink annotated on the video; for at least a first frame of the video, computing a model describing pixels of a bounding region of the ink; for a frame of the video, computing a second region corresponding to the bounding region; computing a comparison between the second region and the model; and updating the ink using the comparison. The method allows the ink to be updated based on the comparison so that occlusion of the ink is calculated with reduced computational complexity One or more device-readable media with device-executable instructions that, when executed by a computing system, direct the computing system to perform operations comprising: receiving a video; receiving digital ink annotated on the video; for at least a first frame of the video, computing a model describing pixels of a bounding region of the ink; for a frame of the video, computing a second region corresponding to the bounding region; computing a comparison between the second region and the model; and updating the ink using the comparison. The ink is updated based on the comparison so that occlusion of the ink is calculated with reduced computational complexity.

An image processing apparatus comprising: means for receiving a video; means for receiving digital ink annotated on the video; for at least a first frame of the video, means for computing a model describing pixels of a bounding region of the ink; for a subsequent frame of the video, means for computing a second region corresponding to the bounding region; means for computing a comparison between the second region and the model; and means for updating the ink using the comparison. For example, the means for receiving a digital ink is the memory 710 or processor 724 or a combination of the memory 710 and processor 724. For example, the means for computing the model, computing a second region and computing the comparison is the occlusion detecting component 104 when configured to carry out the operation of all or part of FIG. 2 or FIG. 6. For example, the means for updating the ink is the ink updating component 106 when configured to carry out the operation of all or part of FIG. 2 or FIG. 6.

The examples illustrated and described herein as well as examples not specifically described herein but within the scope of aspects of the disclosure constitute exemplary means for detecting occlusion of digital ink of an annotated video. For example, the elements illustrated in FIG. 1, such as when encoded to perform the operations illustrated in FIG. 2 or FIG. 6, constitute exemplary means for detecting occlusion of digital ink of an annotated video, and exemplary means for updating the digital ink using information derived from the detected occlusion.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An image processing apparatus configured to detect occlusion of digital ink in a digitally annotated video, the image processing apparatus comprising:
a processor configured to:
receive a video;
identify an annotation made to a first frame in the video, the annotation being made after the first frame in the video has been captured, the annotation comprising digital ink applied to the first frame in the video;
for the first frame of the video, compute a model describing pixels in a bounding region containing the digital ink;
for a second frame of the video, identify an object in a second region that overlaps the bounding region;
compute a comparison between pixels in the second region and the model;
based on the computing, determine that the object is in a foreground with respect to the pixels described by the model;
based on determining that the object is in the foreground with respect to pixels described by the model, determine that a portion of the object is occluding at least a portion of the digital ink;
based on determining that the portion of the object is occluding at least the portion of the digital ink, hide at least the portion of the digital ink occluded by the portion of the object; and
update a display of the digital ink in the second frame to reflect the hiding of at least the portion of the digital ink.

2. The image processing apparatus of claim 1, wherein the model comprises a statistical model of at least one channel of the pixels in the bounding region, and the processor is configured to compute the comparison by comparing the intensity of the at least one channel of the pixels in the second region to the model.

3. The image processing apparatus of claim 1, wherein:
the model comprises a set of sub-models describing pixels of the first frame in a set of respective first sub-regions making up the bounding region;
the second region comprises a set of second sub-regions corresponding to the set of first sub-regions; and
the processor is configured to compute a comparison between each pixel of each second sub-region and the corresponding sub-model.

4. The image processing apparatus of claim 3, wherein each sub-model describes a cell of a grid of pixels.

5. The image processing apparatus of claim 3, wherein the processor is configured to interpolate the comparison at the boundaries between neighboring sub-regions.

6. The image processing apparatus of claim 1, wherein the comparison comprises a computed similarity value between pixels of the second region and the model.

7. The image processing apparatus of claim 6, wherein the comparison comprises an occlusion map indicating pixels of the second region which have a similarity value below a predetermined threshold value.

8. The image processing apparatus of claim 6, wherein the comparison comprises an occlusion probability map calculated from the similarity values of each of the pixels of the second region.

9. The image processing apparatus of claim 8, wherein the probability map is filtered using a cross bilateral filter to generate the comparison.

10. The image processing apparatus of claim 8, wherein the processor is configured to update the ink by applying the probability map to the ink.

11. The image processing apparatus of claim 6, wherein the processor is further configured to:
determine data from the second region; and
update the model to describe pixels of the second region which have a similarity value above a predetermined threshold value if the data from the second region has not yet been included in the model.

12. The image processing apparatus of claim 11, wherein the model is updated according to a learning algorithm having a learning rate.

13. The image processing apparatus of claim 12, wherein the processor is configured to change the learning rate.

14. The image processing apparatus of claim 6, wherein the processor is configured to compute the comparison by:

generating an occlusion map indicating occluded pixels of the second region which have a similarity value below a predetermined threshold value; and for each pixel not indicated as occluded, marking the pixel as occluded if the number of occluded pixels in a selected neighborhood of the pixel is above a predetermined threshold value.

15. The image processing apparatus of claim 1, wherein the processor is further configured to, prior to updating the ink or prior to generating the comparison:

check a set of criteria for the video, the criteria being indicative of the occlusion mechanism being effective; and if the criteria is not fulfilled, then abort any remaining steps for detecting occlusion.

16. The image processing apparatus of claim 1, wherein the processor is configured to compute a second region corresponding to the bounding region by:

selecting a plurality of template pixels of the bounding region;

matching the template pixels of the bounding region to corresponding matching template pixels in the subsequent frame:

generating a homography transform matrix using the matching; and applying the homography transform matrix to the bounding region to generate the second region.

17. The image processing apparatus of claim 1, wherein the bounding region is associated with an object to which the digital ink was applied in the first frame.

18. The image processing apparatus of claim 17, wherein computing the comparison between pixels in the second region and the model further comprises computing a comparison between pixels in the second region and the object to which the digital ink was applied.

19. A computer-implemented method for detecting occlusion of digital ink in a digitally annotated video, comprising operations including:

receiving a video;

receiving an annotation made to a first frame in the video, the annotation being made after the first frame in the video has been captured, the annotation comprising digital ink applied to the first frame of the video;

for the first frame of the video, computing a model describing pixels of a bounding region containing the digital ink;

for a second frame of the video, identifying an object in a second region that overlaps the bounding region;

computing a comparison between pixels in the second region and the model;

based on the computing, determining that the object is in a foreground with respect to the pixels described by the model;

based on determining that the object is in the foreground with respect to pixels described by the model, determining that a portion of the object is occluding at least a portion of the digital ink;

based on determining that the portion of the object is occluding at least the portion of the digital ink, hiding at least the portion of the digital ink occluded by the portion of the object; and updating a display of the digital ink in the second frame to reflect the hiding of at least the portion of the digital ink.

20. One or more device-readable media with device-executable instructions that, when executed by a computing system, direct the computing system to perform operations comprising:

receiving a video;

identifying an annotation made to a first frame in the video, the annotation being made after the first frame in the video has been captured, the annotation comprising digital ink applied to the first frame of the video;

for the first frame of the video, computing a model describing pixels of a bounding region containing the digital ink;

for a second frame of the video, identifying an object in a second region that overlaps the bounding region;

computing a comparison between pixels in the second region and the model;

based on the computing, determining that the object is in a foreground with respect to the pixels described by the model;

based on determining that the object is in the foreground with respect to pixels described by the model, determining that a portion of the object is occluding at least a portion of the digital ink;

based on determining that the portion of the object is occluding at least the portion of the digital ink, hiding a portion of the digital ink occluded by the object in the foreground; and updating a display of the digital ink in the second frame to reflect the hiding of at least the portion of the digital ink.

* * * * *